(12) United States Patent
Tokat

(10) Patent No.: US 11,331,714 B2
(45) Date of Patent: May 17, 2022

(54) PUNCH FOR A STAKING DEVICE AND/OR RIVETING DEVICE, AND METHOD FOR STAKING OR RIVETING A WORKPIECE

(71) Applicant: Robert Bosch GmbH, Stuttgart (DE)

(72) Inventor: Timur Tokat, Sonthofen (DE)

(73) Assignee: Robert Bosch GmbH, Stuttgart (DE)

(*) Notice: Subject to any disclaimer, the term of this patent is extended or adjusted under 35 U.S.C. 154(b) by 643 days.

(21) Appl. No.: 16/307,744

(22) PCT Filed: Apr. 12, 2017

(86) PCT No.: PCT/EP2017/058817
§ 371 (c)(1),
(2) Date: Dec. 6, 2018

(87) PCT Pub. No.: WO2017/211486
PCT Pub. Date: Dec. 14, 2017

(65) Prior Publication Data
US 2019/0299274 A1    Oct. 3, 2019

(30) Foreign Application Priority Data

Jun. 10, 2016  (DE) .......................... 102016210318.0

(51) Int. Cl.
*B23P 11/00* (2006.01)
*B21J 15/08* (2006.01)
(Continued)

(52) U.S. Cl.
CPC ............... *B21J 15/08* (2013.01); *B21J 15/02* (2013.01); *B29C 65/601* (2013.01);
(Continued)

(58) Field of Classification Search
CPC ... B21J 15/08; B21J 15/02; B21J 15/36; B21J 15/14; B29C 65/601; B29C 66/81431;
(Continued)

(56) References Cited

U.S. PATENT DOCUMENTS

| 1,996,250 A | 4/1935 | McNamara |
| 2,147,763 A * | 2/1939 | Becker ................. B21J 15/36 |
| | | 29/509 |

(Continued)

FOREIGN PATENT DOCUMENTS

| CN | 202461403 U | 10/2012 |
| CN | 104661771 A | 5/2015 |

(Continued)

OTHER PUBLICATIONS

International Search Report for PCT/EP2017/058817, dated Jun. 28, 2017.

*Primary Examiner* — Jun S Yoo
(74) *Attorney, Agent, or Firm* — Norton Rose Fulbright US LLP; Gerard Messina

(57) ABSTRACT

A punch for a staking/riveting device having a workpiece receiving opening formed on a pressing surface of the punch to make a workpiece, projecting from a contacting surface, that is at least partially introducible into the receiving opening in response to the pressing surface of the punch approaching the contacting surface and is deformable in conformity with an inner contour of the receiving opening; at least a partial surface of the inner contour being formed in a spherical/ellipsoidal cap shape; and the inner contour of the receiving opening having an inner-contour intermediate surface between a rim of the inner contour on the pressing surface and the spherical or ellipsoidal cap-shaped partial surface that is a cylinder truncated cone jacket-shaped. A staking/riveting device, a joining partner for cooperating with the punch or with the staking/riveting device, a device having at least one staked/riveted workpiece, and a method for staking/riveting a workpiece.

7 Claims, 3 Drawing Sheets

(51) Int. Cl.
    *B29C 65/60*         (2006.01)
    *B29C 65/00*         (2006.01)
    *B21J 15/02*         (2006.01)
    B21J 15/36         (2006.01)
    B29C 65/02         (2006.01)

(52) U.S. Cl.
    CPC .... B29C 66/81431 (2013.01); B29C 66/8322 (2013.01); *B21J 15/36* (2013.01); *B29C 65/02* (2013.01); *B29C 65/606* (2013.01); *B29C 66/41* (2013.01); *B29C 66/81423* (2013.01)

(58) Field of Classification Search
    CPC ... B29C 66/8322; B29C 65/02; B29C 65/606; B29C 66/41; B29C 66/81423
    See application file for complete search history.

(56) References Cited

U.S. PATENT DOCUMENTS 4,630,463 A * 12/1986 Knowlton ................ B21J 15/02
                                                                    29/509
2012/0315109 A1     12/2012 Golovashchenko

FOREIGN PATENT DOCUMENTS

| | | | |
|---|---|---|---|
| GB | 320971 | A | 10/1929 |
| JP | S6153127 | U | 4/1986 |
| JP | S6153127 | B2 * | 11/1986 |
| JP | S63182309 | U | 11/1988 |
| JP | H01156922 | U | 10/1989 |
| JP | H0857959 | A | 3/1996 |
| JP | 2014104740 | A | 6/2014 |

* cited by examiner

PUNCH FOR A STAKING DEVICE AND/OR RIVETING DEVICE, AND METHOD FOR STAKING OR RIVETING A WORKPIECE

FIELD OF THE INVENTION

The present invention relates to a punch for a staking and/or riveting device and to a staking and/or riveting device. The present invention also relates to a joining partner for cooperating with the punch or with the staking and/or riveting device, as well as to a device having at least one staked or riveted workpiece. In addition, the present invention relates to a method for staking or riveting a workpiece.

BACKGROUND INFORMATION

FIG. 1 schematically shows a conventional punch for hot staking. Punch 10, which is (partially) schematically depicted in FIG. 1 has a workpiece receiving opening 12, into which a pin (not shown) to be staked is at least partially introducible in a way that makes the pin at least partially deformable in conformity with an inner contour of workpiece receiving opening 12. The inner contour of workpiece receiving opening 12 is formed as a spherical cap-shaped surface 14.

SUMMARY OF THE INVENTION

The present invention provides a punch for a staking and/or riveting device having the features described herein, a staking and/or riveting device having the features described herein, a joining partner for cooperating with the punch or with the staking and/or riveting device having the features described herein, a device having at least one staked or riveted workpiece having the features described herein, and a method for staking or riveting a workpiece having the features described herein.

The present invention makes it possible for the same inventive punch/for the staking and/or riveting device equipped therewith to be used for staking and/or riveting workpieces, in spite of deviations in the sizes/dimensions of the workpieces. In particular, the present invention is able to readily compensate for tolerance deviations/tolerances in the sizes/dimensions of workpieces (in particular of the same workpiece type), making it possible for these workpieces to nevertheless be reliably staked/riveted. The advantage of the present invention may also be described as making it advantageously possible to compensate for excess material on a workpiece to be staked or riveted, allowing the workpiece in question to be reliably staked/riveted.

As clarified in greater detail below, the present invention also facilitates a process monitoring during a staking/riveting of at least one workpiece. Thus, the present invention also helps lessen the requirements for a control electronics for a staking and/or riveting device, thereby lowering the manufacturing costs for a device of this kind.

An advantageous embodiment of the punch provides that at least a portion of the workpiece be deformable in conformity with the spherical cap-shaped or ellipsoidal cap-shaped partial surface of the inner contour, and, at least insofar as the workpiece has excess material relative to a spherical or an ellipsoidal segment volume covered by the spherical cap-shaped or ellipsoidal cap-shaped partial surface, that a further portion of the workpiece be at least deformable in conformity with the cylinder jacket-shaped or truncated cone jacket-shaped inner-contour intermediate surface. The excess material may thus be deformed in a way that prevents any conventional "material outflows" from remaining on the staked or riveted workpiece. Instead, the excess material may even provide an improved interlocking of the staked or riveted workpiece and a joining partner contacted by it, as clarified in greater detail below.

In particular, the cylinder jacket-shaped or truncated cone jacket-shaped inner-contour intermediate surface may bound the rim of the inner contour at the pressing surface, and the spherical cap-shaped or ellipsoidal cap-shaped partial surface of the inner contour may bound the cylinder jacket-shaped or truncated cone jacket-shaped inner-contour intermediate surface. Thus, the inner contour of the workpiece receiving opening of this embodiment of the punch has a relatively simple shape in spite of the advantages that may be realized therewith.

The truncated cone jacket-shaped inner-contour intermediate surface may have an outer radius at the rim of the inner counter and an inner radius at the spherical cap-shaped or ellipsoidal cap-shaped partial surface of the inner contour, the inner radius being smaller than the outer radius. This may also be described as a formation of a demolding bevel at the inner-contour intermediate surface that facilitates separation of the punch and of the workpiece staked or riveted by it. It is thus relatively simple to separate the punch and the workpiece staked or riveted by it.

The advantages described above are also realized in the case of a staking and/or riveting device having a punch of this kind.

In the same way, the described advantages are also provided by a joining partner for cooperating with this type of punch or with such a staking and/or riveting device.

The advantages are also evident in the case of a device having at least one staked or riveted workpiece, the staked or riveted workpiece projecting from a surface of the device and having an outer contour that includes at least one spherical cap-shaped or ellipsoidal cap-shaped first partial surface, and the outer contour of the staked or riveted workpiece having a cylinder jacket-shaped or truncated cone jacket-shaped second partial surface that bounds the spherical cap-shaped or ellipsoidal cap-shaped first partial surface.

The staked or riveted workpiece may be a pin or a bearing, for example. Thus, low-cost workpieces may be used for executing the present invention. However, it should be noted that the present invention is not limited in the application thereof to workpieces of this kind.

In another advantageous embodiment of the device, the staked or riveted workpiece extends through a through opening to project from the surface of the device and is partially inverted over a rim region that directly surrounds the opening and is formed to project over the surface. This provides an additional support between the staked or riveted workpiece and the joining partner thereof.

The advantages described above are also realized by implementing a corresponding method for staking or riveting a workpiece. It should be appreciated that it is possible to further refine the method in accordance with the above described specific embodiments of the punch, of the staking and/or riveting device and of the joining partner that cooperates therewith.

For example, the workpiece may extend through an opening to project from the contacting surface during the staking or riveting and be partially inverted over a rim region that directly surrounds the opening and projects from the contacting surface. Thus, implementing this specific embodiment of the method also helps improve the holding of the staked or riveted workpiece to the joining partner thereof.

Other features and advantages of the present invention are described below with reference to the figures.

DETAILED DESCRIPTION

Figure 1:
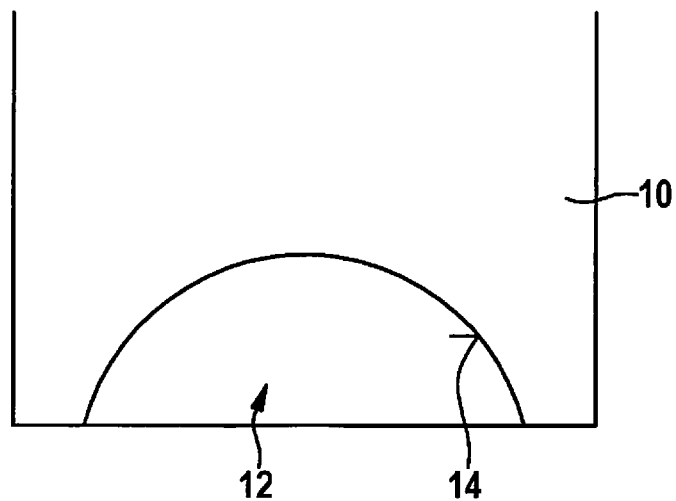
FIG. 1 schematically shows a conventional punch used for hot staking.
Figure 2A:
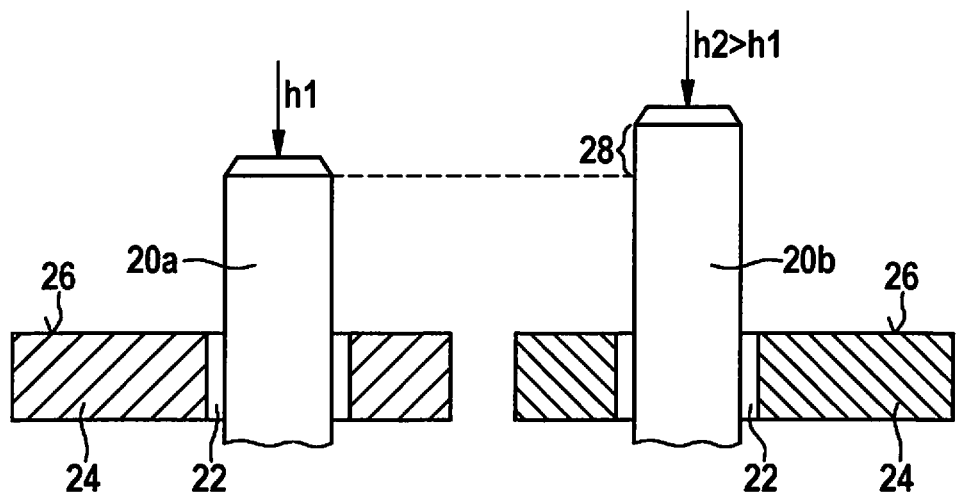
FIGS. 2a, 2b and 2c chematically show workpieces, the joining partners thereof, and a specific embodiment of the punch according to the present invention to clarify the operating principle thereof.
Figure 2B:
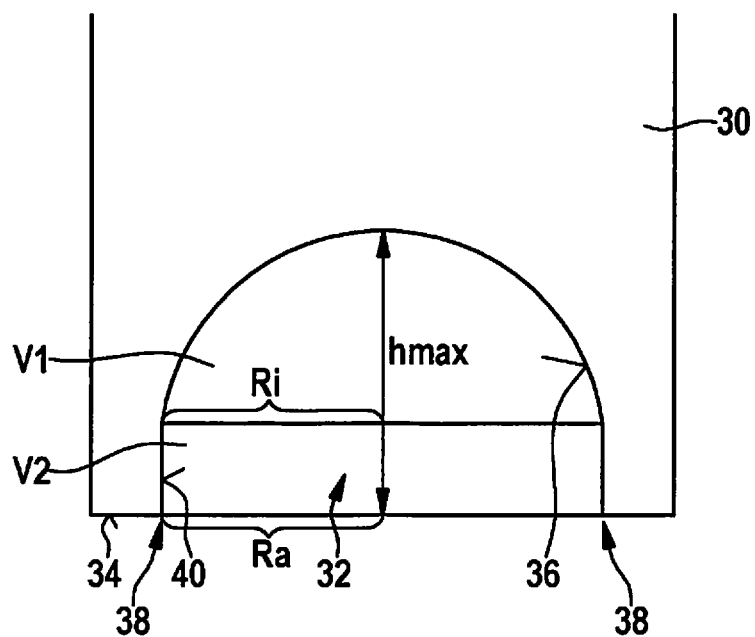
Figure 2C:
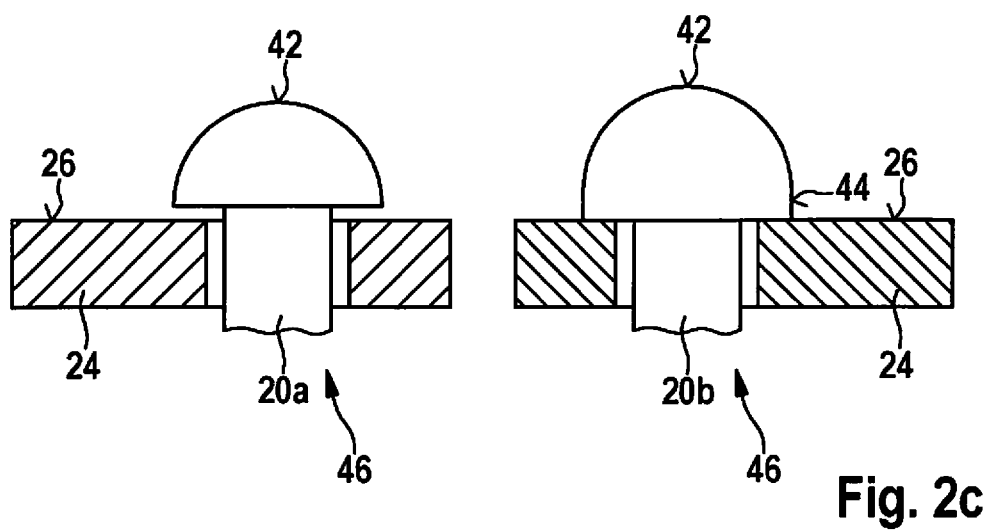

FIG. 2a through 2c show schematic representations of workpieces, of the joining partners thereof, and of a specific embodiment of the punch according to the present invention to clarify the operating principle thereof.

Each workpiece 20a and 20b shown in FIG. 2a that is not staked and not riveted is part of a device (to be manufactured), respectively. Both a first workpiece 20a, as well as a second workpiece 20b are inserted through an opening 22 of joining partner 24 thereof in such a way that respective workpiece 20a and 20b projects from a surface of joining partner 24 thereof referred to in the following as contacting surface 26. This may also be described as respective workpiece 20a and 20b extending through continuous opening 22 of joining partner 24 thereof to project from contacting surface.

In the specific embodiment of FIG. 2a through 2c, for example, each of workpieces 20a and 20b is a pin. However, it should be noted that the described technology is not limited in the usability thereof to a specific type of workpiece. For example, at least one bearing may also be staked or riveted using the described technology. Workpieces 20a and 20b may be made of at least one plastic and/or of at least one metal. Workpieces 20a and 20b may be plastic parts.

Due to tolerances during manufacturing of workpieces 20a and 20b, first workpiece 20a has a first height h1 (orthogonally to contacting surface 26 thereof) that is lower than a second height h2 of second workpiece 20b (orthogonally to contacting surface 26 thereof). This may also be described as second workpiece 20b having excess material 28 (respectively, a material excess) in comparison to first workpiece 20a.

FIG. 2b is a schematized partial view of punch 30 for the advantageous staking of workpieces 20a and 20b. Punch 30 may be used as a part of a staking and/or riveting device. In particular, punch 30 may be advantageously used for hot staking. However, it should be noted that punch 30 is not limited in a usability thereof to a specific method.

Punch 30 has a workpiece receiving opening 32 that is formed on a pressing surface 34 of punch 30 in a way that makes workpieces 20a and 20b at least partially introducible into workpiece receiving opening 32 in response to pressing surface 34 of punch 30 approaching respective contacting surface 26 (from which respective workpiece 20a or 20b projects). In this manner, respective workpiece 20a or 20b is deformable in conformity with an inner contour of workpiece receiving opening 32. Thus, bringing workpieces 20a and 20b into engagement with the inner contour of workpiece receiving opening 32 effects the deformation thereof, in particular as staking or riveting. Pressing surface 34 of punch 30 approaching respective contacting surface 26 may be understood, in particular, as a space between pressing surface 34 of punch 30 and respective contacting surface 26 being reduced until a contact is made between pressing surface 34 and respective contacting surface 26. In the same way, pressing surface 34 of punch 30 may also approach respective contacting surface 26 only until a specified minimum space, that is not equal to zero, is reached between pressing surface 34 and respective contacting surface 26; pressing surface 34 being prevented from approaching respective contacting surface 26 at a space therebeweeen that is below the specified minimum space.

Workpieces 20a and 20b may be successively shaped by punch 30. In the same way, a plurality of (identical or non-identical) workpiece receiving openings 32 may be formed in punch 30, so that workpieces 20a and 20b are also able to be shaped at the same time by punch 30. In particular, punch 30 may be configured for simultaneously shaping a plurality of workpieces 20a and 20b in a respective workpiece receiving opening 32.

A partial surface 36 of the inner contour of workpiece receiving opening 32 has a spherical cap shape or ellipsoidal cap shape.

Moreover, the inner contour of workpiece receiving opening 32 has an inner-contour intermediate surface 40 that is disposed between a rim 38 of the inner contour on pressing surface 34 and spherical cap-shaped or ellipsoidal cap-shaped partial surface 36 and is cylinder jacket-shaped or truncated cone jacket-shaped.

A spherical cap-shaped surface may be understood to be a surface of a spherical segment or a surface of a spherical section. (A spherical segment or spherical section is a portion of a spherical body that is defined by a plane of intersection of the spherical body.) Thus, a spherical cap-shaped surface may be understood to be either a spherical cap-shaped surface or a spherical cap-shaped surface. Accordingly, an ellipsoidal cap-shaped surface may be understood to be a surface of an ellipsoidal segment or a surface of an ellipsoidal section. (An ellipsoidal segment or an ellipsoidal section is a portion of an ellipsoidal body that is defined by a plane of intersection of the ellipsoidal body.) In the following, a cylinder jacket-shaped, respectively truncated cone jacket-shaped surface is understood to correspond to a lateral surface of a cylinder, respectively to a surface that corresponds to a lateral surface of a truncated cone.

The advantageous inner contour of workpiece receiving opening 32 of punch 30 may also be described as a volume of workpiece receiving opening 32 that is bounded by the inner contour and is defined at rim 38 of the inner contour by a plane of pressing surface 34, including a spherical segment-shaped or ellipsoidal segment-shaped first partial volume V1 and a cylindrical or frustoconical second partial volume V2 that resides between rim 38 and first partial volume V1. Thus, in addition (to the conventional spherical segment-shaped or ellipsoidal segment-shaped first partial volume V1), workpiece receiving opening 32 of punch 30 also features the cylindrical or frustoconical second partial volume V2.

Forming additional cylinder jacket-shaped or truncated cone jacket-shaped inner-contour intermediate surface 40 at the inner contour (respectively of cylindrical or frustoconical second partial volume V2 in workpiece receiving opening 32) makes it possible to compensate for excess material 28 without any disadvantages. This may also be described as a "lengthening" of workpiece receiving opening 32 which makes it possible to compensate for the tolerances of workpieces 20a and 20b during the staking or riveting thereof.

Cylinder jacket-shaped or truncated cone jacket-shaped inner-contour intermediate surface 40 (directly) bounds rim 38 of the inner contour at pressing surface 34. Accordingly, spherical cap-shaped or ellipsoidal cap-shaped partial surface 40 of the inner contour (directly) bounds cylinder jacket-shaped or truncated cone jacket-shaped inner-contour intermediate surface 40.

Workpiece receiving opening 32 features a maximum height $h_{max}$ that is lower than (different) heights h1 and h2 of workpieces 20a and 20b. This ensures that each of workpieces 20a and 20b (during the shaping thereof by punch 30) comes into contact at least with spherical cap-shaped or ellipsoidal cap-shaped partial surface 36 during the approach of pressing surface 34 of punch 30 to contacting surface 26 thereof, and thus that at least a portion of each workpiece 20a and 20b is deformable/is deformed in conformity with the spherical cap-shaped or ellipsoidal cap-shaped partial surface 36 of the inner contour. Thus, maximum height $h_{max}$ of workpiece receiving opening 32 makes it possible to ensure that even workpieces having small heights/dimensions/lengths may be staked or riveted by punch 30.

If a workpiece 20b has excess material 28 relative to a spherical or ellipsoidal segment volume (i.e., spherical segment-shaped or ellipsoidal segment-shaped first partial volume V1) covered by spherical cap-shaped or ellipsoidal cap-shaped partial surface 36, another portion of the workpiece is deformable in conformity with cylinder jacket-shaped or truncated cone jacket-shaped inner-contour intermediate surface 40. Thus, cylinder jacket-shaped or truncated cone jacket-shaped inner-contour intermediate surface 40 (respectively, cylindrical or frustoconical second partial volume V2 in workpiece receiving opening 32) provides a "collecting volume" for respective excess material 28. Thus, there is no need to fear any workpiece material emerging from workpiece receiving opening 32 (respectively, workpiece material "welling out" on pressing surface 34) during deformation of a workpiece 20a or 20b. (In the example described here, workpiece 20b has excess material 28 and is, therefore, also partially deformable in conformity with the cylinder jacket-shaped or truncated cone jacket-shaped inner-contour intermediate surface 40.)

Truncated cone jacket-shaped inner-contour intermediate surface 40 may have an outer radius Ra at rim 38 of the inner counter and an inner radius Ri at spherical cap-shaped or ellipsoidal cap-shaped partial surface 36 of the inner contour, inner radius Ri being smaller than outer radius Ra. Thus, at inner-contour intermediate surface 40, a demolding bevel is formed that facilitates separation of punch 30 and workpiece 20a and 20b staked or riveted by it. A quotient from inner radius Ri and outer radius Ra may be within the range of between 0.8 and 0.995, for example, between 0.85 and 0.99, in particular between 0.9 and 0.98.

FIG. 2c shows workpieces 20a and 20b shaped by punch 30. It is discernible that each of workpieces 20a and 20b has an outer contour having at least one spherical cap-shaped or ellipsoidal cap-shaped (first) partial surface 42. This may also be described as each of shaped workpieces 20a and 20b including spherical segment-shaped or ellipsoidal segment-shaped first partial volume V1 (as "rivet head"). In addition, at least the outer contour of second workpiece 20b features a cylinder jacket-shaped or conical jacket-shaped (second) partial surface 44 that bounds spherical cap-shaped or ellipsoidal cap-shaped (first) partial surface 42. Thus, at least second workpiece 20b has cylindrical or frustoconical second partial volume V2 (between spherical segment-shaped or ellipsoidal segment-shaped first partial volume V1 and contacting surface 26).

Neither of shaped workpieces 20a and 20b has the excess material length (parallel to contacting surface 26) that usually frequently occurs following a staking or riveting. In particular, an excess material length is prevented on second workpiece 20b shaped by punch 30 (in spite of excess material 28) thereof.

Using punch 30 or a staking and/or riveting device (respectively, staking and/or riveting system) equipped therewith, it is thus possible to realize a device 46 having at least one staked or riveted workpiece 20a or 20b that projects from a surface 26 of device 46 and features an outer contour having at least one spherical cap-shaped or ellipsoidal cap-shaped (first) partial surface 42. The use of punch 30 or of the staking and/or riveting device equipped therewith to manufacture device 46 is primarily discernible by the outer contour of second workpiece 20b having a cylinder jacket-shaped or truncated cone jacket-shaped (second) partial surface 44 that bounds the spherical cap-shaped or ellipsoidal cap-shaped (first) partial surface 42. Device 46 may be an actuator device (such as a brake booster, in particular), for example, and/or a sensor device.

Figure 3A:
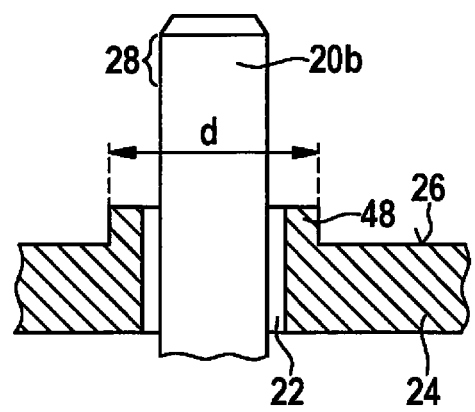
FIGS. 3a, 3b and 3c schematically show a workpiece, the joining partner thereof and the punch of FIG. 2b to clarify a specific embodiment of the method according to the present invention for staking or riveting a workpiece.
Figure 3B:
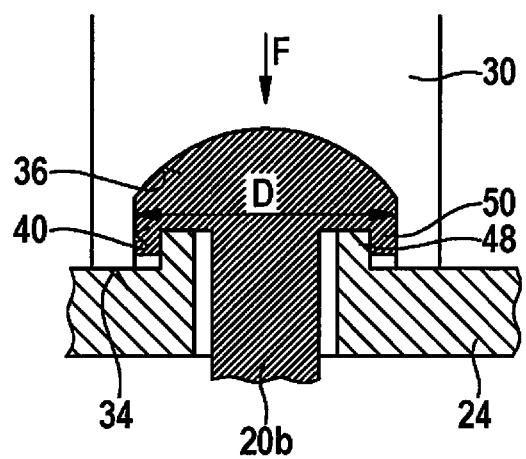
Figure 3C:
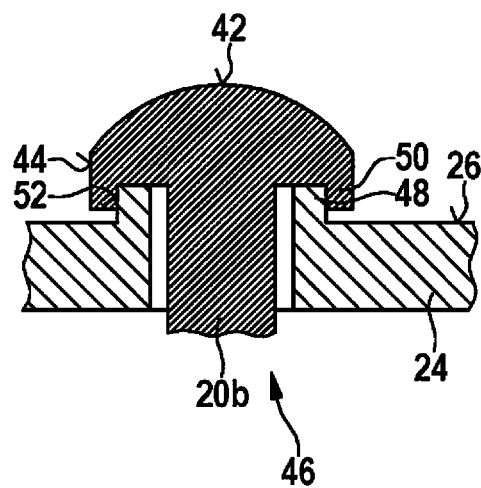

To clarify a specific embodiment of the method according to the present invention for staking or riveting a workpiece, FIG. 3a through 3c schematically show a workpiece, the joining partner thereof and the punch of FIG. 2b.

For example, FIG. 3a through 3c depict a hot staking of (second) workpiece 20b (having excess material 28). However, it should be noted that a feasibility of the method described in the following is not limited to a hot staking. For example, the method may also be used for crimping around round workpiece components.

FIG. 3a shows workpiece 20b prior to the shaping thereof by punch 30. Workpiece 20b extends through an opening 22 that passes through joining partner 24 thereof to project from contacting surface 26 of joining partner 24 that cooperates with punch 30. A rim region 48 that directly surrounds opening 22 and projects from contacting surface 26 is also formed as an advantageous embodiment on joining partner 24 (in addition to opening 22). Rim region 48 may also be described as a dome 48.

As illustrated in FIG. 3a, rim region 48 may project from otherwise smooth contacting surface 26. Alternatively, however, a recess may be formed in contacting surface 26, from which projecting rim region 48 projects. (Annular) projecting rim region 48 may have a (maximum) outer diameter d that is smaller than a diameter D of circular rim 38 of workpiece receiving opening 32. The advantages of such a formation of projecting rim region 48 will be discussed in detail below.

In the method step depicted in FIG. 3b, pressing surface 34 of punch 30 (including workpiece receiving opening 32 formed on pressing surface 34) approaches contacting surface 26, from which workpiece 20b projects. This may follow until contact is made between pressing surface 34 of punch 30 and contact surface 26 or until a predefined minimum distance unequal to zero is reached between pressing surface 34 and respective contacting surface 26. In this manner, workpiece 20b is introduced into workpiece receiving opening 32 and deformed in conformity with an inner contour of workpiece receiving opening 32. At least a portion of workpiece 20b is thereby deformed in conformity with spherical cap-shaped or ellipsoidal cap-shaped partial surface 36 of the inner contour (for example, as a "rivet head"). Since workpiece 20b also has excess material 28, a further portion of workpiece 20b is deformed in conformity with cylinder jacket-shaped or truncated cone jacket-shaped inner-contour intermediate surface 40 situated between rim 38 of the inner contour at pressing surface 34 and spherical cap-shaped or ellipsoidal cap-shaped partial surface 36. Besides "rivet head" being formed in the illustrated example, excess material 28 also acquires an advantageous shape. Therefore, this prevents excess material 28 from being pressed out undesirably or workpiece 20b from being insufficiently staked/riveted.

The method makes possible a clean and precise staking in every tolerance position since excess material 28 is "collected" and "contained" in an advantageous shape. In the case of all staked or riveted workpieces 20b, it is ensured at the same time that endpieces (such as the "rivet head," for example) that point away from contacting surface 26, are fully formed.

A force F to be applied to press pressing surface 34 of punch 30 against contacting surface 26 may be made readily available by a drive (not shown) (such as a pneumatic drive, for example). The drive may be driven by a control device (not shown) that controls a movement/travel of punch 30 over a defined path (for example, until there is contact between pressing surface 34 of punch 30 and contacting surface 26). Punch 30, which is moved along the defined path thereof, contacts component 20b, and the staking/hot staking or riveting may begin. Following the staking/hot staking or riveting, punch 30 may be moved back/returned to the initial position thereof and immediately reused on another workpiece to repeat the method step described here.

Independently of a deviation from height h2 of workpiece 20b from a standard/average height of the respective workpiece type, punch 30 may also be moved/traveled by the defined path (respectively into a defined position). The same defined path (respectively, the same, defined position) may be used for all tolerance positions of the workpiece type. This facilitates a process monitoring during the shaping of workpiece 20b. Thus, there is no need for a sensor system for varying a parameter record to be observed during movement/travel of punch 30. Moreover, a control device that is relatively inexpensive and requires little installation space may be used for movement/travel of punch 30.

In the specific embodiment of the method described here, punch 30 also surrounds projecting rim region 48 (especially in response to a contact between pressing surface 34 of punch 30 and contacting surface 26), and excess material 28 is pressed therearound in the form of an outer sleeve 50. This may also be described as staked or riveted workpiece 20b being partially "inverted" over rim region 48 that directly surrounds opening 22 and is formed to project from contacting surface 26. (The contact between pressing surface 34 of punch 30 and contacting surface 26 may prevent excess material 28 from being pressed out from workpiece receiving opening 32.) Besides "collecting" excess material 28, outer sleeve 50 formed therefrom effects a better adhesion of shaped workpiece 20b to joining partner 24. Thus, in comparison to the related art, shaped workpiece 20b is able to satisfy more stringent requirements.

A device 46 that is manufactured by punch 30, the staking and/or riveting device (respectively, staking and or riveting system) equipped therewith or by executing the method described here may also be discerned by staked or riveted workpiece 20b, which extends through opening 22 to project from the surface 26 of device 46, being partially "inverted" over rim region 48 that directly surrounds opening 22 and is formed to project from surface 26. Another way to describe this is outer sleeve 50 is formed from the workpiece material that at least partially covers an exterior surface 52 of projecting rim region 48 that is directed away from opening 22 (and which may be oriented orthogonally to contacting surface 26) at rim region 48 that directly surrounds opening 22 and has a projecting shape.

What is claimed is:

1. A punch for a staking and/or riveting device, comprising:
    a workpiece receiving opening, which is formed on a pressing surface of the punch to make a workpiece, which projects from a contacting surface, at least partially introducible into the workpiece receiving opening in response to the pressing surface of the punch approaching the contacting surface and deformable in conformity with an inner contour of the workpiece receiving opening;
    wherein:
        at least a partial surface of the inner contour is formed in a spherical cap shape or an ellipsoidal cap shape;
        an inner-contour intermediate surface is disposed between a rim of the inner contour on the pressing surface and the spherical cap-shaped or ellipsoidal cap-shaped partial surface and is cylinder jacket-shaped or truncated cone jacket-shaped;
        the cylinder jacket-shaped or truncated cone jacket-shaped inner-contour intermediate surface bounds the rim of the inner contour at the pressing surface, and the spherical cap-shaped or ellipsoidal cap-shaped partial surface of the inner contour bounds the cylinder jacket-shaped or truncated cone jacket-shaped inner-contour intermediate surface; and
        the truncated cone jacket-shaped inner-contour intermediate surface has an outer radius at the rim of the inner contour and an inner radius at the spherical cap-shaped or ellipsoidal cap-shaped partial surface of the inner contour, and the inner radius is smaller than the outer radius.

2. The punch of claim 1, wherein at least a portion of the workpiece is deformable in conformity with the spherical cap-shaped or ellipsoidal cap-shaped partial surface of the inner contour, and, insofar as the workpiece has an excess material relative to a spherical or ellipsoidal segment volume that is covered by the spherical cap-shaped or ellipsoidal cap-shaped partial surface, a further portion of the workpiece is deformable in conformity with the cylinder jacket-shaped or truncated cone jacket-shaped inner-contour intermediate surface.

3. A staking and/or riveting device, comprising:
    a punch, including:
    a workpiece receiving opening, which is formed on a pressing surface of the punch to make a workpiece, which projects from a contacting surface, at least partially introducible into the workpiece receiving opening in response to the pressing surface of the punch approaching the contacting surface and deformable in conformity with an inner contour of the workpiece receiving opening;
    wherein:
        at least a partial surface of the inner contour is formed in a spherical cap shape or an ellipsoidal cap shape;
        an inner-contour intermediate surface is disposed between a rim of the inner contour on the pressing surface and the spherical cap-shaped or ellipsoidal cap-shaped partial surface and is cylinder jacket-shaped or truncated cone jacket-shaped;
        the cylinder jacket-shaped or truncated cone jacket-shaped inner-contour intermediate surface bounds the rim of the inner contour at the pressing surface, and the spherical cap-shaped or ellipsoidal cap-shaped partial surface of the inner contour bounds the cylinder jacket-shaped or truncated cone jacket-shaped inner-contour intermediate surface; and the truncated cone jacket-shaped inner-contour intermediate surface has an outer radius at the rim of the inner contour and an inner radius at the spherical cap-shaped or ellipsoidal cap-shaped partial surface of the inner contour, and the inner radius is smaller than the outer radius.

4. A joining partner for cooperating with a punch or a staking and/or riveting device that includes the punch, comprising:

at least one opening, through which a workpiece to be staked and/or riveted is introducible so that the workpiece projects from a contacting surface of the joining partner;

wherein:

a rim region directly surrounds the opening and projects from the contacting surface;

the punch includes a workpiece receiving opening, which is formed on a pressing surface of the punch to make the workpiece at least partially introducible into the workpiece receiving opening in response to the pressing surface of the punch approaching the contacting surface and deformable in conformity with an inner contour of the workpiece receiving opening;

at least a partial surface of the inner contour is formed in a spherical cap shape or an ellipsoidal cap shape;

an inner-contour intermediate surface is disposed between a rim of the inner contour on the pressing surface and the spherical cap-shaped or ellipsoidal cap-shaped partial surface and is cylinder jacket-shaped or truncated cone jacket-shaped;

the cylinder jacket-shaped or truncated cone jacket-shaped inner-contour intermediate surface bounds the rim of the inner contour at the pressing surface, and the spherical cap-shaped or ellipsoidal cap-shaped partial surface of the inner contour bounds the cylinder jacket-shaped or truncated cone jacket-shaped inner-contour intermediate surface; and the truncated cone jacket-shaped inner-contour intermediate surface has an outer radius at the rim of the inner contour and an inner radius at the spherical cap-shaped or ellipsoidal cap-shaped partial surface of the inner contour, and the inner radius is smaller than the outer radius.

5. A device, comprising:

at least one staked or riveted workpiece that projects from a contacting surface of the device, is at least partially introducible into a workpiece receiving opening formed on a pressing surface of a punch in response to the pressing surface of the punch approaching the contacting surface, is deformable in conformity with an inner contour of the workpiece receiving opening that has (a) a spherical or ellipsoidal cap shaped partial surface and (b) an inner-contour intermediate surface disposed between a rim of the inner contour on the pressing surface and the spherical cap-shaped or ellipsoidal cap-shaped partial surface, the inner-contour intermediate surface being cylinder jacket-shaped or truncated cone jacket-shaped, so that the at least one staked or riveted workpiece has an outer contour that includes:

at least one spherical cap-shaped or ellipsoidal cap-shaped first partial surface; and a cylinder jacket-shaped or truncated cone jacket-shaped second partial surface that bounds the spherical cap-shaped or ellipsoidal cap-shaped first partial surface, wherein the staked or riveted workpiece extends through an opening to project from the contacting surface of the device and is partially inverted over a rim region that directly surrounds the opening and is formed to project from the contacting surface.

6. The device of claim 5, wherein the staked or riveted workpiece includes a pin or a bearing.

7. A method for staking or riveting a workpiece that projects from a contacting surface, the method comprising:

introducing the workpiece into a workpiece receiving opening that is formed on a pressing surface of a punch that approaches the contacting surface;

wherein:

at least a partial surface of the inner contour is formed in a spherical cap shape or an ellipsoidal cap shape;

an inner-contour intermediate surface, which is disposed between a rim of the inner contour on the pressing surface and the spherical cap-shaped or ellipsoidal cap-shaped partial surface, is cylinder jacket-shaped or truncated cone jacket-shaped;

the introducing of the workpiece into the workpiece receiving opening causes at least a portion of the workpiece to be deformed in conformity with the spherical cap-shaped or ellipsoidal cap-shaped partial surface of the inner contour; and material of the workpiece that is in excess relative to a spherical or ellipsoidal segment volume that is covered by the spherical cap-shaped or ellipsoidal cap shaped partial surface is deformed in conformity with the cylinder jacket-shaped or truncated cone jacket-shaped inner-contour intermediate surface, wherein:

the cylinder jacket-shaped or truncated cone jacket-shaped inner-contour intermediate surface bounds the rim of the inner contour at the pressing surface, and the spherical cap-shaped or ellipsoidal cap-shaped partial surface of the inner contour bounds the cylinder jacket-shaped or truncated cone jacket-shaped inner-contour intermediate surface; and the truncated cone jacket-shaped inner-contour intermediate surface has an outer radius at the rim of the inner contour and an inner radius at the spherical cap-shaped or ellipsoidal cap-shaped partial surface of the inner contour, and the inner radius 1s smaller than the outer radius.

\* \* \* \* \*